United States Patent [19]

Nelson et al.

[11] 4,350,178

[45] Sep. 21, 1982

[54] BALL COCK ASSEMBLY

[76] Inventors: Merritt J. Nelson, 857 Indian Lakes Rd., NW., Sparta, Mich. 49345; Merritt S. Nelson, 7000 Kreuter Rd., NE., Belmont, Mich. 49306

[21] Appl. No.: 263,870

[22] Filed: May 15, 1981

[51] Int. Cl.³ ..................... F16K 31/26; F16K 33/00
[52] U.S. Cl. ................................. 137/444; 137/441; 251/44
[58] Field of Search ............. 137/434, 435, 436, 441, 137/442, 444; 4/366, 367; 251/44

[56] References Cited

U.S. PATENT DOCUMENTS

| | | | |
|---|---|---|---|
| 571,023 | 11/1896 | Scott | 137/434 |
| 951,172 | 3/1910 | Biedenmeister | 137/444 |
| 1,042,775 | 10/1912 | English | 137/444 |
| 2,198,416 | 4/1940 | Robertshaw | 137/444 |
| 2,271,419 | 1/1942 | Egan | 137/444 |
| 2,302,274 | 11/1942 | Svirsky | 137/444 |
| 2,799,290 | 7/1957 | Svirsky | 137/436 |
| 2,995,144 | 8/1961 | Manning et al. | 137/444 |
| 3,543,795 | 12/1970 | Schwindt | 251/44 |

FOREIGN PATENT DOCUMENTS 806135 12/1936 France ................. 251/44

*Primary Examiner*—George L. Walton

*Attorney, Agent, or Firm*—Varnum, Riddering, Wierengo & Christenson

[57] ABSTRACT

A ball cock assembly (10) mounted to a water supply pipe (12) in a fill tank includes a valve housing (16) in which is mounted a valve (18) for regulating the flow of water through the ball cock assembly (10). The valve housing (16) includes a central passage (40) having chambers (42, 46) of differing diameters. The chamber (46) is in fluid communication with tank fill tube (22) and back fill tube (24). The valve (18) is generally cylindrical in configuration and includes an upwardly facing first piston surface (76) and a downwardly facing second piston surface (84) upstream of the first piston surface (76). The valve (18) also includes first and second shoulders (78, 80) which seat against valve seats (44, 48) in the central passage (40) of the housing (16). The valve (18) includes an orifice (90) therethrough which communicates fluid through chamber (42) above the first piston surface (76). The valve (18) also includes ports (54) which are selectively aligned with the outlets of the valve housing during reciprocation of the valve (18). The valve is biased toward a closed position by a conventional float (20). In operation, a gradual closing of the valve (18) is provided by a differential fluid pressure acting against the first and second piston areas (76, 84).

9 Claims, 4 Drawing Figures

BALL COCK ASSEMBLY

DESCRIPTION

1. Technical Field

The invention relates to a ball cock assembly including a float-operated valve member which provides for pressure equalized closing of the valve.

2. Background Art

In designing ball cock assemblies for use in toilet tanks, it is desirable that they be relatively quiet in operation and provide an adequate water flow to the fill tank of the toilet. Further, it is desirable that the ball cock be provided with an antisiphon device for preventing back flow of water from the tank to the water supply pipe. A good commercial ball cock assembly is preferably made of relatively light weight parts and includes a minimum of moving parts. It is also desirable that the ball cock assembly be manufactured from plastic or other relatively inexpensive materials.

The common ball cock assembly includes a float actuated valve in the form of a diaphragm, a piston-like member or ball valve which is positioned over the water supply pipe and which serves to regulate fluid flow from the water supply pipe to the fill tank of the toilet. The valve member is secured by an arm to a float which, as the water level in the fill tank rises, causes the valve member to be forced into seating engagement over the water supply pipe and thus cut off water flow to the fill tank. Many of the known ball cock assemblies have been provided with a means for enhancing the closing action of the valve as the float rises in the fill tank. In one form, the fluid pressure provided by the water coming from the water supply pipe is used to enhance the closing action of the valve. If, for example, the fluid pressure is applied to opposing faces of the valve, a fluid equalized operation of the valve is accomplished. The water pressure also serves to maintain the valve in the closed position.

One example of such a ball cock assembly having a fluid enhanced closing is shown in the Manning et al U.S. Pat. No. 2,995,144 patent, issued Aug. 8, 1961. The ball cock assembly shown in the Manning et al patent includes a sleeve valve which controls fluid flow from a water supply pipe to the fill tank. The sleeve valve is slidably mounted over the water supply pipe and includes a shoulder having an area against which fluid pressure supplied from the water supply pipe acts so as to aid in closing of the valve. The sleeve valve includes ports which communicate with an outlet to the fill tank.

Another form of a ball cock assembly is shown in the Egan U.S. Pat. No. 2,271,419 patent, issued Jan. 27, 1942. The Egan patent discloses a valve having a piston-like plunger provided with a central orifice therethrough and an annular shoulder around the bottom portion of the piston. Water flows through the orifice from the supply pipe to an area above the plunger to provide a fluid pressure to enhance closing of the valve.

The Biedenmeister U.S. Pat. No. 951,172 patent, issued Mar. 8, 1910, for example, discloses a ball cock assembly in which is provided a spool valve having a central orifice therethrough. The central orifice communicates water from a supply pipe to an area above the valve so that the fluid pressure aids in closing of the valve.

As can be seen from the foregoing references, the concept of providing a float actuated, piston-like valve member wherein fluid pressure enhances the closed action of the valve is shown. However, the single seating area provided on the valve may allow for a slight leakage past the valve in a closed position, which can cause an annoying noise and wastes water.

DISCLOSURE OF THE INVENTION

In accordance with the invention, a ball cock ssembly includes a water supply pipe which is disposed in the fill tanks of the toilet. A valve housing is mounted at the top portion of the water supply pipe. The housing has an inlet in communication with the supply pipe and an outlet which communicates fluid to the fill tank. The interior of the housing comprises a central passage having a first chamber of a selected diameter above the outlet and a second chamber having a diameter less than that of the first chamber and disposed upstream of and below the first chamber. Disposed within each of the first and second chambers are valve seats which cooperate with a valve member to be described below.

A float-operated valve member is mounted for reciprocation in the central passage of the valve housing. The valve member regulates flow from the inlet to the outlet and thus to the fill tank of the toilet. The valve member has an upwardly facing, first piston surface and a shoulder which cooperates with the valve seat in the first chamber within the valve housing to seal the first chamber from the second chamber. The valve member also has a second shoulder which cooperates with the valve seat in the second chamber of the housing to seal the second chamber from the inlet. Thus, two seating areas are provided on the valve member so as to ensure a seal to prevent leakage past the valve when in a closed position.

The valve member includes a downwardly facing, second piston surface disposed upstream of the first piston area. The second piston area has an area less than the first piston area. An orifice is provided through the body of the valve so as to communicate fluid from the inlet to the first chamber in the valve housing. In this way, a fluid pressure is provided against the first piston area.

The valve member is provided with port means, typically in the form of apertures in the valve member, which are selectively aligned with the outlet on the valve housing so as to communicate water from the inlet to the fill tank when the valve is in an open position. The valve member is actuated by a conventional float arm which includes a float disposed in the fill tank.

As the water level in the fill tank rises, the float rises so as to bias the valve member into the closed position, with the fluid pressure acting on both piston areas so as to provide a pressure equalized closing of the valve member. In this way, annoying noise often caused by chattering of the valve member as it closes is eliminated. Further, the two seating areas provide a seal so as to prevent leakage past the valve when in a closed position.

The valve member has a cylindrical configuration and includes a stem which extends through the wall of the valve housing for connection to the arm of the float. The first and second chambers within the central passage of the valve housing are aligned along a common axis so that in cross-section, the central passage has a stepped configuration.

In one embodiment of the invention, an antisiphon valve may be mounted in the piston member. The antisiphon valve prevents back flow of water from the fill tank to the water inlet.

BRIEF DESCRIPTION OF THE DRAWINGS

The invention will be described with reference to the accompanying drawings wherein like members bear like reference numerals in which.

BEST MODE FOR CARRYING OUT THE INVENTION

Figure 1:
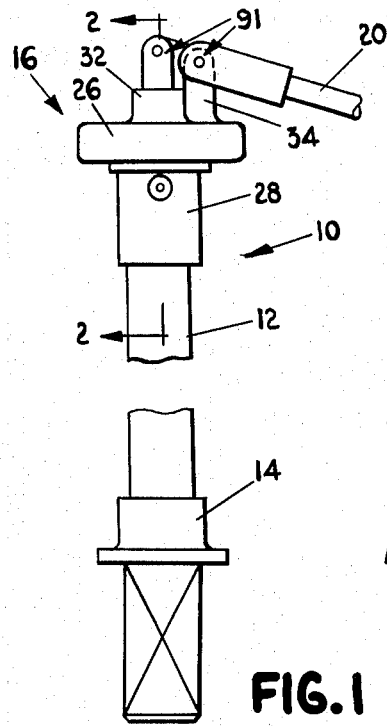
FIG. 1 is a plan view of a ball cock assembly in accordance with the invention.

With reference to FIG. 1, a ball cock assembly 10 includes a water supply pipe 12 which is secured at a lower end by a fitting 14 to a water supply source. Water flows from the tank into the water supply pipe 12 under pressure and rises to the top portion thereof. Secured at the top portion of the water supply pipe 12 is a valve housing 16 in which is mounted a valve 18 which regulates the flow of water through the ball cock assembly 10. Attached to the valve housing is a conventional float rod 20 which is also secured with the valve 18 for vertical movement therewith. Connected to the valve housing 16 and in fluid communication therewith is a tank fill tube 22 which, when the valve 18 is in open position, allows for the passage of waer through the water supply tank 12 to a fill tank. Also in fluid communication with the valve housing is a back fill tube 24.

The valve housing 16 comprises a top section 26 and a bottom section 28. The sections 26 and 28 are secured together along mating threads 30, Alternatively, the sections can be bolted together. The top section 26 includes an upwardly facing cylindrical portion 32 having a central bore therethrough which slidably receives the valve 18. Formed with the top section 26 is a support 34 for the float rod 20. The manner in which the float rod 20 is secured to the valve 18 and support 34 will be described below. The valve housing 16 as well as the water supply pipe 12 and valve 18 are preferably made of a molded plastic material, such as Celcon.

Figure 4:
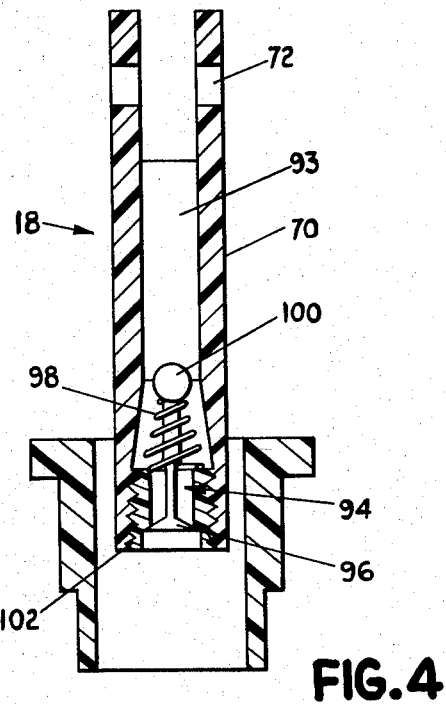
FIG. 4 is a detailed cross-sectional view of an alternate embodiment of the valve shown in FIG. 2.

In the interior of the valve housing 16 is a passage 40 in which the valve 18 is slidably mounted. The passage 40 has a stepped configuration in cross-section and includes an upper chamber 42 formed between the top section 26 and a first shoulder 44. A central chamber 46 is formed between the first shoulder 44 and a second shoulder 48 and a third or lower chamber is formed between the shoulder 48 and a third shoulder 50. Thus it can be seen that the passage 40 in the valve housing has three distinct interior areas each of which has a different diameter. Adjacent the central chamber 46 are orifices 52 and 54 which communicate the interior of the valve housing 16 with the tank fill 22 and the back fill 24 tubes respectively. The back fill tube 24 is preferably a flexible plastic tube which is secured to the valve housing 16 by means of a nipple 58 formed with the housing 16. The tank fill tube 22 is preferably a molded plastic member having a fitting 60 which is received within a recess 62 in the valve housing 16. The fitting 60 can have a diameter greater than the tak fill tube so that the space 63 between the wall of the tank fill tube 22 and the fitting 60 provides an antisiphon opening. Alternatively, the fitting 60 and tank fill tube 22 can be of the same diameter and a separate antisiphon device, such as shown in FIG. 4, can be provided.

The valve 18 has a generally cylindrical configuration and includes an upwardly-extending stem 70 which is slidably received in the cylindrical portion 32 of the valve housing. The stem 70 includes an aperture 72 for mounting the float rod 20. The stem 70 carries an O-ring 71 for sealing against the interior wall of cylindrical section 32 so as to prevent fluid flow past the valve 18. The configuration of the valve 18 generally conforms to that of the interior of the valve housing 16. In this regard, the valve 18 has a top differential piston area 76 which is formed by an annular shoulder 78 about the periphery of the valve 18. The central portion 79 of the sleeve valve 18 has a reduced diameter compared to the top differential piston area 76 and terminates with a shoulder 80. The lower portion 81 of the sleeve valve 18 has a reduced diameter compared to the central portion 79 thereof. The interior portion 82 of the valve 18 is generally open and disposed in the interior thereof is a second differential piston area 84 having a surface area less than that of the top differential piston area 76.

Figure 2:
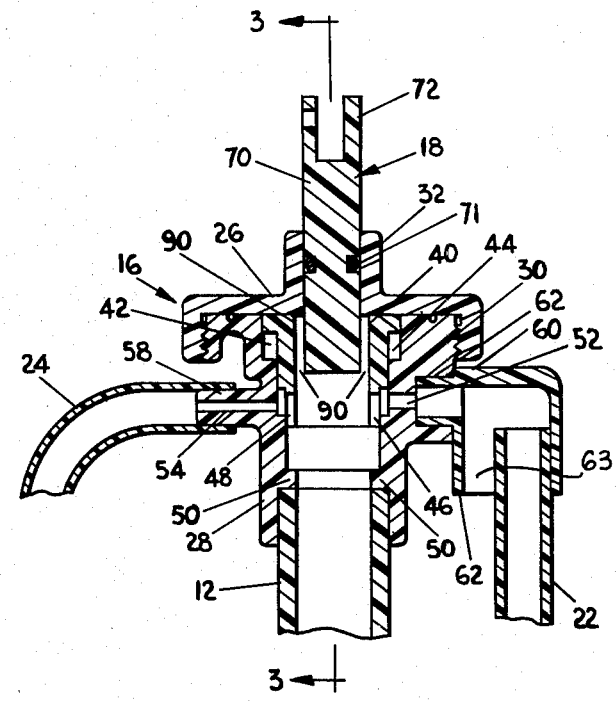
FIG. 2 is a cross-sectional view taken along lines 2—2 of FIG. 1 showing the valve member in the raised or open position.

In the wall of the lower portion 81 of the valve 18 are notches or cut-out portions 86 disposed on diametrically opposed portions of the valve 18. When the valve 18 is in the open position as shown in FIG. 2, the notches 86 are aligned with the orifices 52 and 54 communicating with the tank fill and back fill tubes respectively so as to provide for fluid flow from the interior of the valve housing to the tubes.

Figure 3:
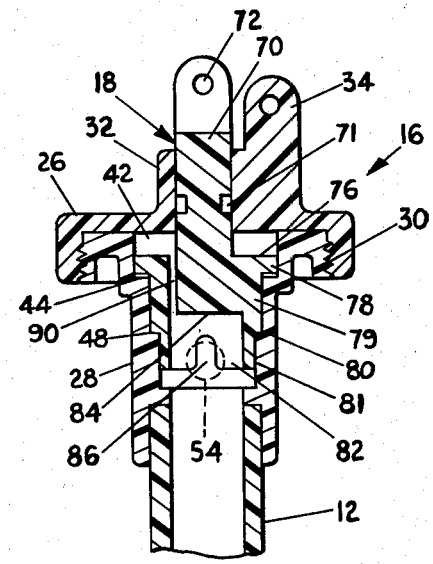
FIG. 3 is a cross-sectional view taken along lines 3—3 of FIG. 2 showing the valve member in the lowered or closed position.

Extending through the central portion of the valve 18 are orifices 90 which provide for communication from the water supply pipe 12 to the upper chamber 42 of the valve housing 16 so as to provide a fluid pressure against the top fluid differential piston area 76. Thus, it can be seen that fluid pressure acts against both the top and bottom differential piston areas 76 and 84 of the sleeve valve 18 so as to provide for fluid equalized closing of the valve. Further, the shoulders 78, 80 on the valve 18 cooperate with the corresponding shoulders 44, 48, in the interior of the valve housing 16, which function as valve seats, so as to provide for sealing of the valve when in a closed position as shown in FIG. 3 to prevent fluid flow therethrough.

The float rod 20 is secured to the valve housing 16 and valve 18 in a conventional fashion by means of cotter pins 91. The pins 91 are inserted through the float rod 20 and the corresponding apertures in the valve 18 and in the section 34 of the valve housing. The float rod 20 operates in a known fashion so as the float rod 20 rises in the fill tank, the valve 18 is forced downwardly into a closed or sealing position as seen in FIG. 3.

FIG. 4 shows an embodiment of the valve 18 wherein an antisiphon device which prevents reversed flow from the tank to the supply pipe 12 is mounted in the central stem 70 of the valve. In this regard, the central stem 70 has an open bore 93 in which is mounted a spring-loaded poppet valve 94. The spring-loaded poppet valve includes a poppet 96 and a spring 98 mounted between a stop member 100 secured with a poppet and a seat 102 within the interior of the valve stem. The poppet 96 has a valve area of a generally frusto-conical configuration which seats against the corresponding surface 102 in the stem 70. The diameter of the central bore 93 of the stem 70 exceeds the total area of the back fill and tank fill orifices by one-thid.

In operation, flushing of the toilet causes the fill tank to empty, thus allowing the float to drop in the tank and lift the valve member out of engagement with the seats. Water passes from the water supply pipe and through the orifices in the valve member to the fill tank so that filling of the tank begins. As the water level in the fill tank rises, the float ascends upwardly and, due to the pivot mounting, causes the valve member to be forced downwardly towards the valve seats.

The orifices extending through the valve member permit water to flow from the water supply pipe to the first chamber in the valve housing so that fluid pressure is exerted against the first differential piston area of the valve member. This fluid pressure biases the valve member towards the seats. Thus, closing of the valve is provided by the rise of the float in the fill tank as well as the fluid pressure exerted against the first piston area of the valve.

Since fluid pressure is exerted gainst both piston areas of the valve, gradual closing of the valve takes place, with downward movement of the valve towards the seat resisted by the fluid acting against the second piston area. The gradual closing of the valve eliminates annoying chattering during closing or the intake of air through the valve, which could occur if the valve were to close quickly. When the water in the fill tank has reached the desired level, the float and the fluid pressure maintain the valve in a closed position with the shoulders on the valve member engaging the seats in the central passage of the housing. Thus, the two seating areas provide a seal to prevent further fluid flow past the valve.

The above-described ball cock assembly is a relatively simple operation and has few parts. There are no diaphragms zor other parts which would tend to wear out during operation of the valve and thus low maintenance costs would be associated with the ball cock. Also, reduced lever requirements for the float are necessary since closing is in part provided by fluid pressure acting against the top of the valve member. Providing fluid pressure on opposing faces of the valve also tends to reduce wear since shearing action along the sides of the valve is reduced.

The ball cock assembly can be manufactured of relatively inexpensive plastic materials such as Celcon and can be made of four pieces: the water supply pipe, the valve housing, the valve member itself and the float.

The embodiment shown in FIG. 4 wherein an antisiphon device or vacuum breaker is mounted in the valve member itself provides a relatively simple device which prevents back flow of water from the fill tank to the water supply pipe. In this regard, if the supply pipe breaks and thus causes a vacuum which would tend to draw water from the fill tank, the poppet valve opens against the spring and allows air to be drawn through the stem down into the water supply pipe. In this way, water is prevented from flowing from the fill tank to the water supply pipe. Mounting of the antisiphon device in the valve member also allows for relatively easy maintenance as opposed to prior known devices wherein the antisiphon valve was mounted at the bottom of the water supply pipe, which necessitated removal of the pipe for servicing of the valve.

The foregoing and description of drawings are merely illustrative of the invention and are not intended to limit the invention to the above-described embodiments. Variations and changes which may be obvious to one skilled in the art may be made without departing from the scope and spirit of the invention as defined in the appended claims.

The embodiments of the invention in which an exclusive property or privilege is claimed are defined as follows:

1. A ball cock assembly comprising:
   a water supply pipe disposed in a fill tank;
   a valve housing mounted to said water supply pipe, said housing including an inlet in communication with said water supply pipe, outlet means for communicating fluid to said fill tank and a central passage communicating said inlet with said outlet means;
   said central passage having a first chamber of a selected diameter above said outlet means, a second chamber of a diameter less than the diameter of said first chamber and upstream of and below said first chamber, and valve seats disposed in each of said first and second chambers;
   a float-operated valve member mounted for reciprocation in said central passage so as to regulate flow from said inlet to said outlet means, said valve member having
      means defining an upwardly facing, first piston surface, a first shoulder cooperating with said valve seat in said first chamber to seal said first chamber from said second chamber;
      means defining a second shoulder which cooperates with said valve seat in said second chamber to seal said second chamber from said inlet;
      means defining a downwardly facing, second piston surface upstream of said first piston surface, said second piston surface having an area less than that of said first piston surface;
   orifice means in said valve member for communicating fluid from said inlet to said first chamber so as to provide a fluid pressure in said first chamber against said first piston surface;
   port means on said valve member for regulating flow from said inlet to said outlet means, said port means being selectively aligned with said outlet means during reciprocation of said valve between open and closed positions; and
   a float connected with said valve member and disposed in said fill tank, said float providing a biasing force for closing said valve member as the fluid level in the tank rises;
   whereupon a gradual closing of the valve member is provided by the differential fluid pressure acting against said first and second piston areas until said first and second shoulders are seated against their respective valve seats.

2. The ball cock assembly of claim 1 wherein said orifice means includes at least one passage through said valve member.

3. The ball cock assembly of claim 2 wherein said valve member has a cylindrical configuration.

4. The ball cock assembly of claim 3 wherein said valve member includes a stem extending through said housing for connection to said float.

5. The ball cock of assembly of claim 4 further including an antisiphon valve disposed in said outlet means.

6. The ball cock assembly of claim 4 further including an antisiphon valve mounted in said valve member.

7. The ball cock assembly of claim 6 wherein said antisiphon valve is a spring-biased poppet mounted in a bore on the stem of said valve member.

8. The ball cock assembly of claim 1 wherein said central passage and said water supply pipe lie along a common longitudinal axis.

9. The ball cock assembly of claim 1 wherein the outlet means is in said second chamber.

* * * * *